G. W. PROUTY.
TIRE WRAPPING MACHINE.
APPLICATION FILED MAY 27, 1920.
1,413,776.
Patented Apr. 25, 1922.
3 SHEETS—SHEET 1.
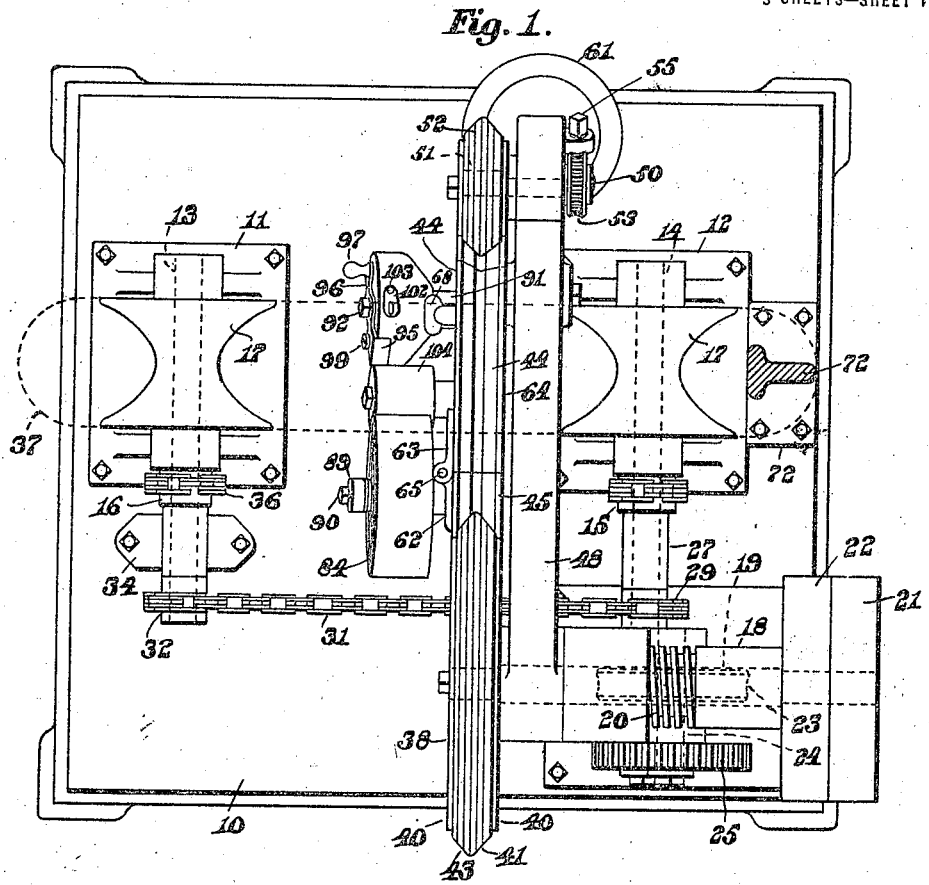
Fig. 1.
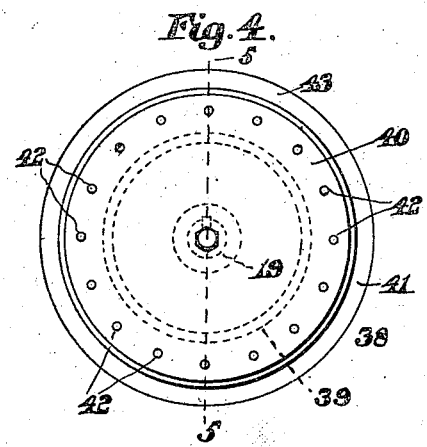
Fig. 4.
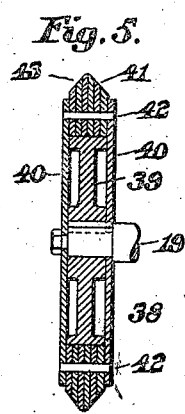
Fig. 5.
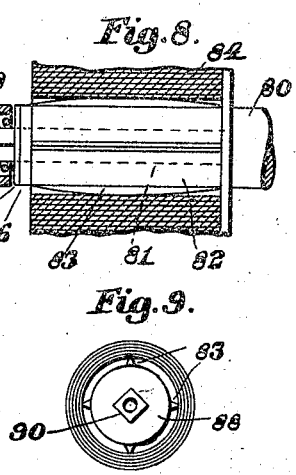
Fig. 8.
Fig. 9.
Inventor:
George W. Prouty,
by Walter E. Lombard,
Atty.

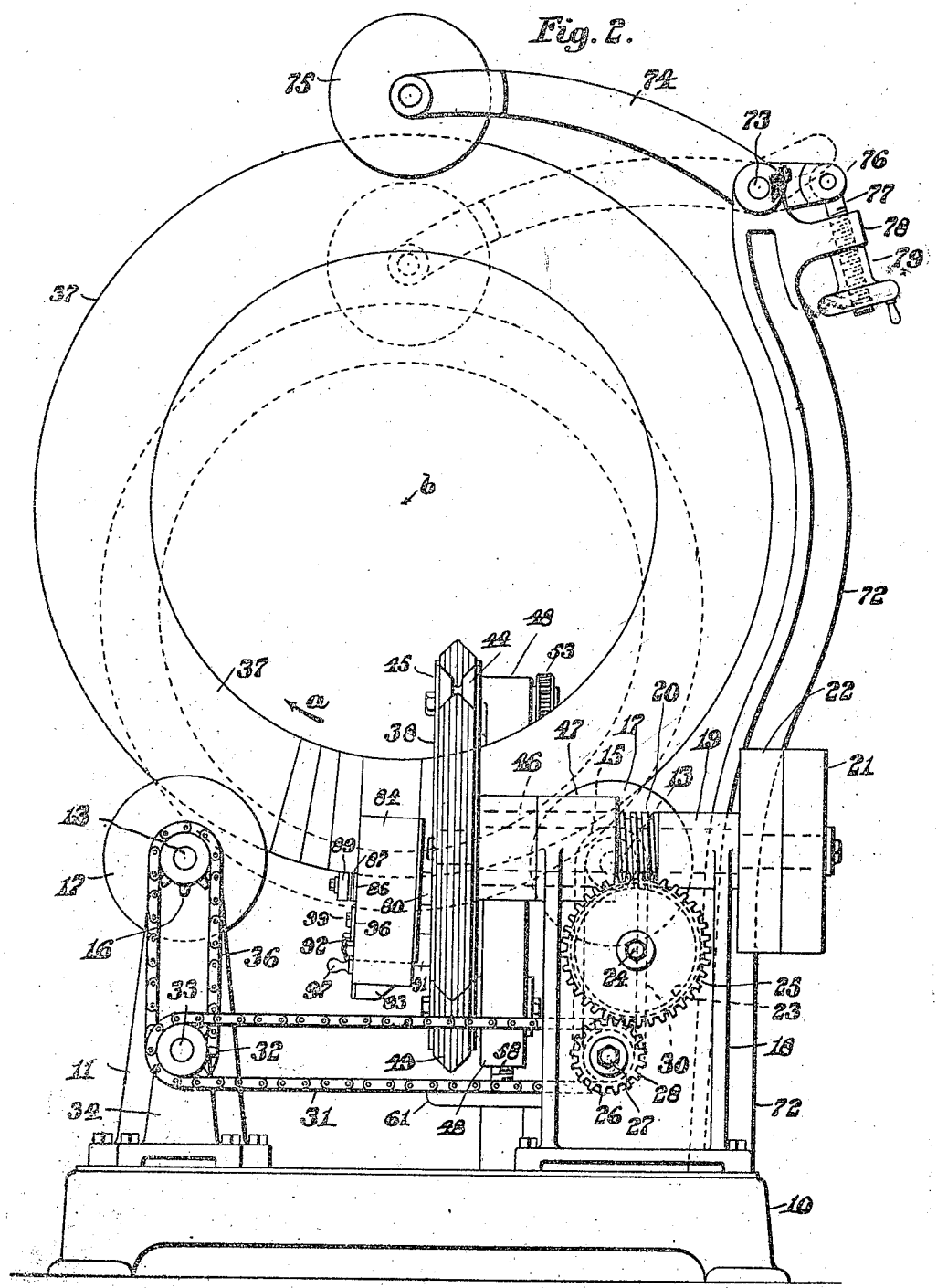

G. W. PROUTY.
TIRE WRAPPING MACHINE.
APPLICATION FILED MAY 27, 1920.

1,413,776.

Patented Apr. 25, 1922.
3 SHEETS—SHEET 3.

Inventor:
George W. Prouty,
by Walter E. Lombard,
Atty.

UNITED STATES PATENT OFFICE.

GEORGE W. PROUTY, OF MILTON, MASSACHUSETTS.

TIRE-WRAPPING MACHINE.

1,413,776.   Specification of Letters Patent.   Patented Apr. 25, 1922.

Application filed May 27, 1920. Serial No. 386,357.

*To all whom it may concern:*

Be it known that I, GEORGE W. PROUTY, a citizen of the United States of America, and a resident of Milton, in the county of Norfolk and Commonwealth of Massachusetts, have invented certain new and useful Improvements in Tire-Wrapping Machines, of which the following is a specification.

This invention relates to machines for wrapping tires with strips of paper preparatory to shipping them and particularly to machines of this character designed to wrap single tires.

The main object of the invention is to improve and simplify the construction of this class of machines and make them more effective in operation.

One object of the invention is to provide a device for automatically applying adhesive to the paper strip as it is wound in helixes around the tire, this adhesive securing the various winds of paper together and preventing the accidental unwinding of the same.

A further object of the invention is the provision of means for hinging a short section of the shuttle to the body thereof so that it may be moved laterally when it is desired to insert a tire within said shuttle.

A further object of the invention is to provide a simplified construction of mechanism for simultaneously driving the shuttle and the tire to be wrapped.

A further object of the invention is to provide a more positive frictional driving mechanism for the shuttle and also means whereby the shuttle may be adjusted to center it with the section of the tire being wrapped.

A further object of the invention is to provide a simple but effective device to retard the unwinding of the roll of paper.

With these various objects in view, the invention consists of certain novel features of construction and arrangement of parts which will be understood readily by reference to the description of the drawings and to the claims to hereinafter given.

For the purpose of illustrating the invention, one preferred form thereof is illustrated in the drawings, this form having been found to give satisfactory and reliable results although it is to be understood that the various instrumentalities of which the invention consists can be variously arranged and organized and the invention is not limited to the precise arrangement and organization of these instrumentalities as hereinshown and described, except as required by the scope of the appended claims.

Of the drawings:

Figure 1 represents a plan of a machine embodying the principles of the present invention.

Figure 2 represents a side elevation of the same showing an automobile tire positioned on the revoluble work supports.

Figure 4 represents a side elevation of the shuttle-driving member.

Figure 5 represents a section of same on line 5, 5, on Fig. 4.

Figure 8 represents a sectional detail of the device for supporting the roll of paper.

Figure 9 represents an end elevation of the same, and

Similar characters indicate like parts throughout the several figures of the drawings.

Figure 3:
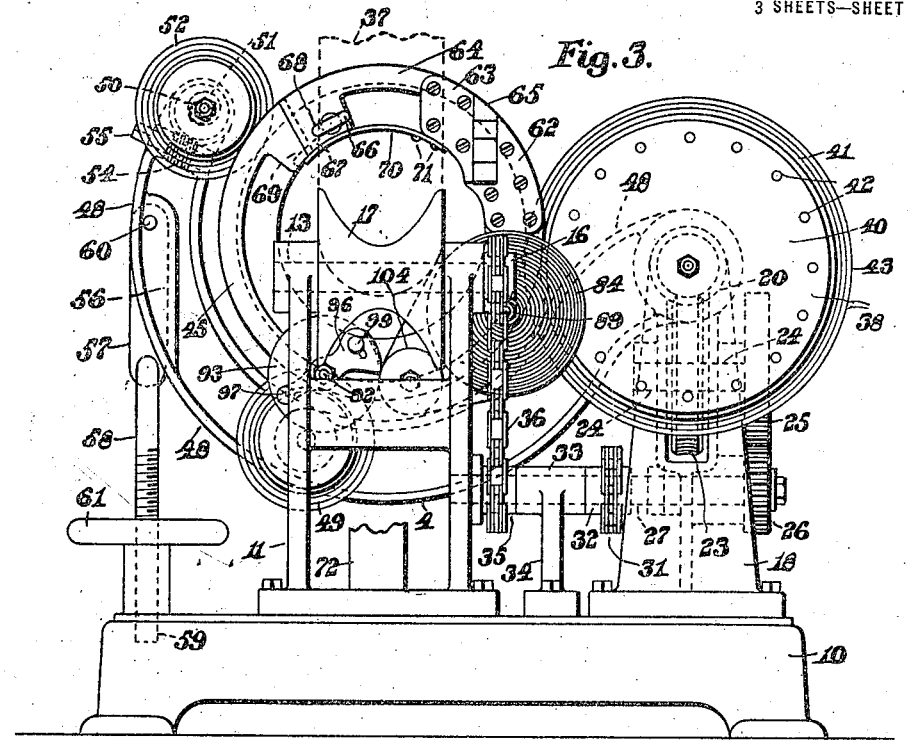
Figure 3 represents an end view of the same.
Figure 10:
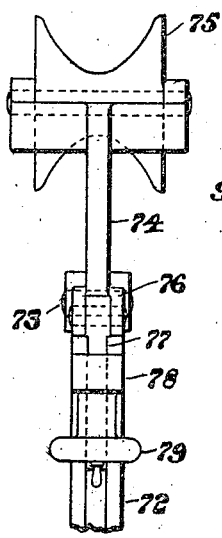
Figure 10 represents an end elevation of the devices for adjusting the position of the holding-down lever.
Figure 6:
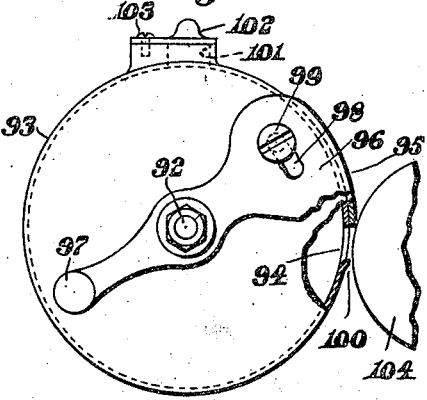
Figure 6 represents an end elevation of the adhesive receptacle and a portion of the wheel for retaining the paper strip in contact with the periphery thereof.
Figure 7:
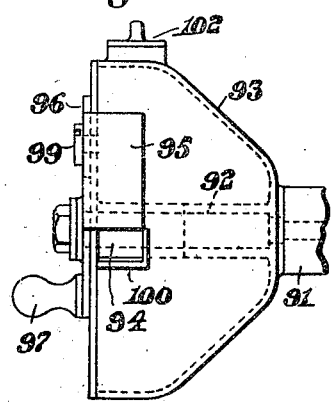
Figure 7 represents a side elevation of said receptacle and the support therefor.

In the drawings, 10 is a base having secured to the upper face thereof two standards 11 and 12 in the upper ends of which are short revoluble shafts 13 and 14 having sprocket wheels 15 and 16 secured to the outer ends thereof.

The upper ends of the standards 11 and 12 are forked and between the forked ends thereof are positioned revoluble work supports 17, each support being secured to one of the revoluble shafts 13 or 14.

The base 10 has also secured to the upper face thereof, a standard 18 in the upper end of which is revolubly mounted a shaft 19 having a worm 20 secured thereto and revoluble therewith.

The outer end of the shaft 19 has mounted thereon a fixed pulley 21 and a loose pulley 22.

By means of a belt upon the fixed pulley 21, rotary movement may be imparted to the shaft 19.

The worm 20 meshes with a worm wheel 23 mounted upon a short shaft 24 revoluble in bearings in the standard 18.

The outer end of the shaft 24 has secured thereto a gear 25 meshing with a pinion 26 on a horizontal shaft 27 revolubly mounted in bearings in the standards 12 and 18.

This horizontal shaft 27 has secured thereto and revoluble therewith, sprocket wheels 28 and 29.

An endless chain or other driving member 30 is mounted upon the sprocket wheels 15 and 28 and thereby transmits rotary movement from the horizontal shaft 27 to one of the supporting rolls 17.

The sprocket wheel 29 is connected by an endless chain or other driving member 31 to a sprocket wheel 32.

This sprocket wheel 32 is mounted on the other end of a short revoluble shaft 33 mounted in bearings in the standard 11 and the bracket 34.

Between the bearings in the standard 11 and bracket 34 a sprocket wheel 35 is secured to the shaft 33 and an endless sprocket chain 36 connects this sprocket wheel 35 with the sprocket wheel 16 and thereby imparts rotary movement to the other work-supporting roll 17 from the revoluble shaft 33.

In the drawings a tire 37 is shown upon the work-supporting rolls 17 and when rotary motion is imparted to the shaft 19, it is obvious that, by means of this system of gearing and chains, the work-supporting rolls 17 will be rotated in unison in the same direction and cause the tire to be moved thereon in the direction of the arrow $a$ on Fig. 2 of the drawings and about the center $b$ of said tire.

The shaft 19 has secured to one end, the driving pulley 21 and to its opposite end the shuttle-driving member 38.

This driving member 38 is made up of a wheel 39 keyed to the shaft 19 and having on opposite faces thereof, disks 40.

Surrounding the periphery of the wheel 39 are a plurality of annular members 41 preferably of leather, leatherboard, or some similar material, said annular members being secured to the disks 40 by means of a plurality of rivets 42.

The inner disk 40 is keyed to the shaft 19 by the same key which keys the wheel 39 to said shaft.

It is obvious therefore that this driving member 38 is positively driven by the rotation of the shaft 19.

The periphery of the annular members 41 of said driving member 38 is tapered as indicated at 43.

This tapered periphery 43 of the driving member 38 fits into an annular V-shaped groove 44 in the annular shuttle 45 and said V-shaped periphery 43 contacts directly with the walls of said V-shaped groove 44 and is at all times retained in frictional contact therewith, means being provided to regulate the amount of friction between these surfaces and to take up the wear as will be hereinafter more clearly described.

The standard 18 has mounted therein a bushing 46 forming a bearing for the shaft 19 between the worm 20 and the shuttle-driving member 38.

This bushing 46 extends outwardly beyond the hub 47 and through a cylindrical bearing in one end of the curved member or yoke 48.

This yoke 48 is freely movable about the projecting end of the bushing 46 and about the axis of the revoluble driving shaft 19.

This yoke has secured thereto intermediate its ends, a revoluble roller 49, the periphery of which is tapered to fit the V-shaped groove 44 in the annular shuttle 45.

In the free end of the yoke 48 is mounted a short shaft 50 having an eccentric 51 on one end thereof on which is mounted a revoluble roll 52, the periphery of which is tapered to fit the annular V-shaped groove 44 of the shuttle 45.

On the opposite end of the shaft 50 is secured a worm wheel 53 meshing with a worm 54 revolubly mounted in the yoke 48, said worm 54 having a squared end 55 by which it may be rotated about its axis.

When the worm is rotated about its axis it will rotate the worm gear 53 and move the eccentric 51 about the axis of the short shaft 50 and cause the axis of the roller 52 to be moved toward and from the shuttle 45 thereby regulating the frictional contact between the walls of the V-shaped annular groove 44 of said shuttle 45 and the peripheral surfaces of the driving member 38.

The yoke 48 is provided with a recess 56 in which is mounted a flat extension 57 of a threaded rod 58, the lower end of which is positioned in a socket 59 in the top of the base 10.

The upper end of the flat projection 57 is pivoted at 60 to the yoke 48 and the threaded portion of the rod 58 is provided with an adjusting nut 61 by which the yoke 48 may be moved about the axis of the bushing 46 and driving shaft 19.

By means of this adjustment, the annular shuttle 45 supported by the yoke may be adjusted to cause the center of said annular shuttle to be brought into alinement with the center of the work being wound and supported upon the revoluble work-supporting rolls 17.

One end of the body portion of the shuttle 45 has secured thereto, one leaf 62 of a hinge, the other leaf 63 of which is secured to one end of the movable section 64 of said annular shuttle.

The hinge 62 and 63 is secured to a side face of the shuttle so that said movable section 64 may be moved laterally about the hinge pin 65 to provide an opening for the insertion of a tire or other annular article which it is desired to wrap.

The free end of the movable member 64 is provided with locking devices 66 which may be of any usual construction, said locking device securing the movable member to the body portion of the shuttle 65 during the wrapping operation.

As shown in the drawings, the locking device is represented as a pivoted latch 67 controlled by a handle 68 and with its free end extending into a recess 69 in the body portion of the shuttle and normally retained in this position by means of a spring 70 secured at 71 to the inner face of the movable section 64.

Secured to the base 10 is a vertical support 72 having a forked upper end provided with a fulcrum pin 73 on which is mounted a lever 74 in the free forked end of which is mounted a revoluble grooved wheel 75, the weight of which is sufficient to force the tire downwardly into firm contact with the groove-supporting rolls 17 so that when said rolls 17 are rotated, the rotation of the tire 37 about its center $b$ will be insured.

This lever 74 has an arm 76 radiating from the fulcrum 73 and its outer forked end has pivotally mounted therein, the threaded rod 77 projecting through an ear 78 extending laterally from the vertical support 72.

The lower threaded end of the rod 77 is provided with an adjusting nut 79 by which the lever 74 may be adjusted about its pivot 73.

By means of this construction the lever 74 may be adjusted to position the weighted roller 75 for various diameters of tires 37.

When it is desired to use the machine for wrapping rolls of linoleum or similar goods, this vertical support and weighted roll 75 may be dispensed with, the roll of linoleum resting upon the roller supports 17 and having sufficient weight to cause said work to be moved endwise when the rollers 17 are rotated.

Extending from one face of the annular shuttle 45 is a stud 80 having a reduced shank 81 on which is loosely mounted a sleeve 82 having curved radial blades 83 extending therefrom.

The roll of wrapping paper 84 is adapted to be positioned upon said sleeve 82 and the blades 83 will be forced into the wall of the bore of said roll and insure the rotation of said roll with said sleeve.

The shaft 81 has a squared end 85 on which is mounted a friction disk 86 and a metal washer 87 bearing against the outer face of said friction disk.

This friction disk 86 bears against the outer end of the sleeve 82 and is pressed against said end by means of a helical spring 88 within a cup-shaped member 89, non-revolubly mounted upon said squared end 85 and secured in position by means of the screw 90.

This spring-pressed friction disk coacting with the sleeve 82 prevents the paper roll from racing during the wrapping operation while permitting the paper to be unwound freely as needed to form the helical wrappings about the work supported upon the rotatable supports 17.

The annular shuttle 45 also has projecting from the side face thereof a stud 91 having threaded to its outer end a cylindrical support 92 having an annular receptacle 93 for adhesive to be applied to the wrapping strips as it is unwound from the roll to be wrapped about the work upon the work supports 17.

This receptacle 93 has a discharge opening 94 in the periphery thereof, said opening being normally closed by a peripheral flange 95 formed upon a plate 96 movable about the axis of the cylindrical support 92 by means of the handle 97.

This plate 96 has a curved slot 98 therein through which extends a stop member 99 limiting the movement of said plate in opposite directions.

It is obvious that the plate may be clamped by means of the member 99 in adjusted position, wholly or partially uncovering the discharge opening 94 so that the amount of adhesive being delivered from the receptacle 93 may be readily regulated.

When the machine is not in operation, the discharge opening is closed by means of the flange 95, the ends of which bear against the ribs 100 formed upon the periphery of the receptacle 93.

The receptacle 93 is provided with an opening 101 closed by a plate 102 pivoted at 103, which closure may be of any well-known construction.

Secured to the shuttle 45 at a point between the receptacle 93 and the roll of paper 84 is an idler roll 104 the periphery of which is adjacent to the periphery of the receptacle 93 and immediately opposite the discharge opening 94.

The paper strip as unwound from the roll 84 passes partially around the idler roll 104 to the work being wrapped.

This idler roll 104 will cause one edge of the paper strip to be held tightly against the periphery of the adhesive receptacle 93 and as said strip moves toward the work being wound, a portion of the inner face of the strip adjacent one edge will have adhesive applied to the paper so that when the strip of paper is wound about the work in helixes overlapping each other, the overlapping portion of one helix will be secured by said adhesive to the helix of wrapping paper upon which it is superimposed.

By means of this device an article or other piece of work such as a tire may be quickly wound with a continuous strip of paper, the various helixes of which will be firmly secured together by an adhesive automatically applied to the strip during the wrapping operation.

At the completion of the wrapping operation the paper is separated and an additional amount of adhesive is applied to the end thereof, said end being secured to the previously wrapped portion.

The wrapped tire is then removed and a new tire is placed in position preparatory to being wound.

This makes a very simple construction of machine for wrapping a single tire or other annular article and may be used equally as well to wrap rolls of material.

It is believed that the operation and many advantages of the invention will be readily understood without further description.

Having thus described my invention, I claim—

1. In a machine of the class described, a work support; an annular shuttle through which the work is adapted to be moved; a roll of paper carried by said shuttle; a member projecting from one face of said shuttle; and a receptacle for adhesive mounted upon and surrounding said member and provided with a discharge opening.

2. In a machine of the class described, a work support; an annular shuttle through which the work is adapted to be moved; a roll of paper carried by said shuttle; a member projecting from one face of said shuttle; a receptacle for adhesive mounted upon and surrounding said member and provided with a discharge opening of less width than the width of said paper; and slidable means for closing said opening.

3. In a machine of the class described, a work support; an annular shuttle through which the work is adapted to be moved; a roll of paper carried by said shuttle; a member projecting from one face of said shuttle; a receptacle for adhesive mounted upon and surrounding said member and provided with a discharge opening adapted to discharge adhesive upon one portion only of said paper adjacent one edge thereof; and slidable means for controlling the discharge of adhesive from said opening.

4. In a machine of the class described, a work support; an annular shuttle through which the work is adapted to be moved; a roll of paper carried by said shuttle; a member projecting from one face of said shuttle; a cylindrical receptacle for adhesive carried by said member and provided with a discharge opening in its periphery; and a member pivoted to said receptacle and provided with a peripheral flange adapted to close said opening.

5. In a machine of the class described, a work support; an annular shuttle through which the work is adapted to be moved; a revoluble shaft; a shuttle-driving member on said shaft; a member adjustable about the axis of said shaft; revoluble shuttle supports on said member; and a roll of paper carried by said shuttle.

6. In a machine of the class described, a work support; an annular shuttle through which the work is adapted to be moved; a revoluble shaft; a shuttle-driving member on said shaft; a member adjustable about the axis of said shaft; revoluble shuttle supports on said member; a roll of paper carried by said shuttle; and means for adjusting one of said revoluble supports toward and from the center of said shuttle.

7. In a machine of the class described, a work support; an annular shuttle through which the work is adapted to be moved; a revoluble shaft; a shuttle-driving member on said shaft; a curved member adjustable about the axis of said shaft and partially surrounding said shuttle; revoluble shuttle supports on said member; and a roll of paper carried by said shuttle.

8. In a machine of the class described, a work support; an annular shuttle through which the work is adapted to be moved and having an annular V-shaped peripheral groove; a revoluble shaft; a shuttle-driving member on said shaft having a tapered periphery fitted to the shuttle groove; a member adjustable about the axis of said shaft; revoluble shuttle supports on said member having tapered peripheries fitting the shuttle groove; and a roll of paper carried by said shuttle.

9. In a machine of the class described, a work support; an annular shuttle through which the work is adapted to be moved; a revoluble shaft; a shuttle-driving member on said shaft; a member movable about the axis of said shaft; revoluble shuttle supports on said member; a roll of paper carried by said shuttle; and means for adjusting said member about its pivot.

10. In a machine of the class described, a work support; an annular shuttle through which the work is adapted to be moved; a roll of paper carried by said shuttle; a revoluble shaft; a shuttle-driving member on said shaft; a member movable about the axis of said shaft; shuttle supports on said member; a threaded rod pivotally connected to the outer end of said member; and an adjusting member for said rod.

11. In a machine of the class described, a work support; an annular shuttle through which the work is adapted to be moved; a roll of paper carried by said shuttle; a revoluble shaft; a shuttle-driving member on said shaft; a member movable about the axis of said shaft; shuttle supports on said member; a threaded rod pivotally connected at its upper end to the outer end of said member and having its lower end positioned in a socket in the base of the machine; and an adjusting member for said rod.

12. In a machine of the class described, a plurality of rotatable work supports; an annular shuttle through which the work is adapted to be moved; a roll of paper carried by said shuttle; a revoluble shaft; a shuttle-driving member thereon; a vertical support provided with a lateral ear; a lever pivoted thereto provided with an arm radiating from the pivot thereof; a roller in the outer end of said lever adapted to rest on said tire; a threaded rod pivoted to said arm and extending through the ear on said vertical support; and an adjusting nut on said rod.

13. In a machine of the class described, a rotatable annular shuttle; a lateral stud thereon having a squared end; a bladed sleeve revoluble on said stud; a roll of paper on said sleeve; and means on said squared end for retarding the rotation of said sleeve.

14. In a machine of the class described, a rotatable annular shuttle; a lateral stud thereon having a squared end; a bladed sleeve revoluble on said stud; a roll of paper on said sleeve; a friction disk on said squared end bearing against the end of said sleeve; a cup-shaped member on said squared end; and a spring within said cup-shaped member for retaining said friction disk in contact with said sleeve end.

15. In a machine of the class described, a work support; an annular shuttle through which the work is adapted to be moved; a revoluble shaft; a shuttle-driving member on said shaft; a member movable about the axis of said shaft and having mounted thereon a plurality of freely revoluble shuttle supports; means for adjusting one of said shuttle supports toward and from the center of said shuttle; and a roll of paper on said shuttle.

16. In a machine of the class described, a work support; an annular shuttle through which the work is adapted to be moved; means for driving said shuttle; a pivoted yoke adapted to be adjusted relatively to said shuttle; a revoluble roller mounted on said yoke intermediate its ends; an eccentric stud positioned in the free end of said yoke; means for moving said eccentric about its axis; and a revoluble roller support on said stud.

17. In a machine of the class described, a work support; an annular shuttle through which the work is adapted to be moved; means for driving said shuttle; a pivoted yoke adapted to be adjusted relatively to said shuttle; a revoluble roller mounted on said yoke intermediate its ends; an eccentric stud positioned in the free end of said yoke; a worm wheel on said stud; a revoluble worm meshing therewith; and a revoluble roller support on said stud.

18. In a machine of the class described, a work support; an annular shuttle through which the work is adapted to be moved; a revoluble shaft; a shuttle-driving member on said shaft; a member adjustable about the axis of said shaft; and revoluble shuttle supports on said member.

19. In a machine of the class described, a work support; an annular shuttle through which the work is adapted to be moved; a revoluble shaft; a shuttle-driving member on said shaft; a member adjustable about the axis of said shaft; revoluble shuttle supports on said member; and means for adjusting one of said revoluble supports toward and from the center of said shuttle.

20. In a machine of the class described, a work support; an annular shuttle through which the work is adapted to be moved; a revoluble shaft; a shuttle-driving member on said shaft; a curved member adjustable about the axis of said shaft and partially surrounding said shuttle; and revoluble shuttle supports on said member.

21. In a machine of the class described, a work support; an annular shuttle through which the work is adapted to be moved and having an annular V-shaped peripheral groove; a revoluble shaft; a shuttle-driving member on said shaft having a tapered periphery fitted to the shuttle groove; a member adjustable about the axis of said shaft; and revoluble shuttle supports on said member having tapered peripheries fitting the shuttle groove.

22. In a machine of the class described, a work support; an annular shuttle through which the work is adapted to be moved; a revoluble shaft; a shuttle-driving member on said shaft; a member movable about the axis of said shaft; and revoluble shuttle supports on said member.

Signed by me at 746–7 Old South Bldg., Boston, Mass., this 24th day of May, 1920.

GEORGE W. PROUTY.

Witnesses:
WALTER E. LOMBARD,
MAZIE W. KIMBALL.